United States Patent
Garvey

(10) Patent No.: US 10,125,739 B2
(45) Date of Patent: Nov. 13, 2018

(54) DIRECT-DRIVE POWER CONVERSION SYSTEM FOR WIND TURBINES COMPATIBLE WITH ENERGY STORAGE

(71) Applicant: The University of Nottingham, Nottingham (GB)

(72) Inventor: Seamus Dominic Garvey, Nottingham (GB)

(73) Assignee: The University of Nottingham, Nottingham (GB)

( * ) Notice: Subject to any disclaimer, the term of this patent is extended or adjusted under 35 U.S.C. 154(b) by 0 days.

(21) Appl. No.: 14/898,657

(22) PCT Filed: Aug. 1, 2014

(86) PCT No.: PCT/IB2014/063630
§ 371 (c)(1),
(2) Date: Dec. 15, 2015

(87) PCT Pub. No.: WO2014/203230
PCT Pub. Date: Dec. 24, 2014

(65) Prior Publication Data
US 2016/0146193 A1    May 26, 2016

(30) Foreign Application Priority Data
Jun. 16, 2013  (GB) .................................. 1310717.2

(51) Int. Cl.
*F01K 25/02* (2006.01)
*F03B 13/14* (2006.01)
(Continued)

(52) U.S. Cl.
CPC .............. *F03B 13/14* (2013.01); *F03B 13/26* (2013.01); *F03D 9/10* (2016.05); *F03D 9/18* (2016.05);
(Continued)

(58) Field of Classification Search
CPC . F16H 39/01; F03D 15/00; F03D 9/28; F03D 9/25; F03B 13/14; F03B 13/26
(Continued)

(56) References Cited

U.S. PATENT DOCUMENTS 2,120,546 A   6/1938  Burt .................................. 60/14
3,988,897 A   11/1976 Strub .............................. 60/682
(Continued)

FOREIGN PATENT DOCUMENTS

FR    679 672    4/1930
GB    499 308    1/1939
(Continued)

*Primary Examiner* — Jason Shanske
(74) *Attorney, Agent, or Firm* — Harrington & Smith

(57) ABSTRACT

A system suitable for extracting power directly from the main shafts of slow-moving mechanical systems. The system has a closed gas circuit having a lower-pressure (LP) side and a higher-pressure (HP) side. The LP side is at a pressure substantially greater than atmospheric pressure. The system includes primary compressors coupled to the wind turbines, thermal stores coupled to heat-exchangers on both the LP and HP sides of the closed gas circuit, a secondary motor-compressor set and an expander-generator set. The system allows some degree of independence between the input power resource and the output power. When substantial wind power is present and the demand for electrical power is weak, this system can export a fraction of the energy captured and store the rest. When the wind resource is low, the system can export more power than is being collected by drawing energy from the thermal stores.

9 Claims, 4 Drawing Sheets

(51) Int. Cl.
*F03D 9/18* (2016.01)
*F16H 39/01* (2006.01)
*F03D 15/00* (2016.01)
*F03B 13/26* (2006.01)
*F03D 9/28* (2016.01)
*F03D 9/10* (2016.01)
*F03D 9/25* (2016.01)

(52) U.S. Cl.
CPC .............. *F03D 9/25* (2016.05); *F03D 9/28* (2016.05); *F03D 15/00* (2016.05); *F16H 39/01* (2013.01); *F03D 9/257* (2017.02); *Y02E 10/28* (2013.01); *Y02E 10/38* (2013.01); *Y02E 10/722* (2013.01); *Y02E 60/17* (2013.01)

(58) Field of Classification Search
USPC .......................................................... 60/682
See application file for complete search history.

(56) References Cited

U.S. PATENT DOCUMENTS

| | | |
|---|---|---|
| 4,229,661 A | 10/1980 | Mead et al. |
| 2008/0050234 A1 | 2/2008 | Ingersoll et al. ......... 416/132 B |
| 2009/0021012 A1 | 1/2009 | Stull et al. ...................... 290/44 |
| 2011/0041501 A1 | 2/2011 | Gerard |
| 2013/0087301 A1* | 4/2013 | Hemrle .................... F01K 3/12 165/4 |

FOREIGN PATENT DOCUMENTS

| | | |
|---|---|---|
| GB | 499308 A | 1/1939 |
| GB | 510 631 | 8/1939 |
| WO | WO 2010/125568 A2 | 11/2010 |
| WO | WO 2014/053662 A1 | 4/2014 |

\* cited by examiner

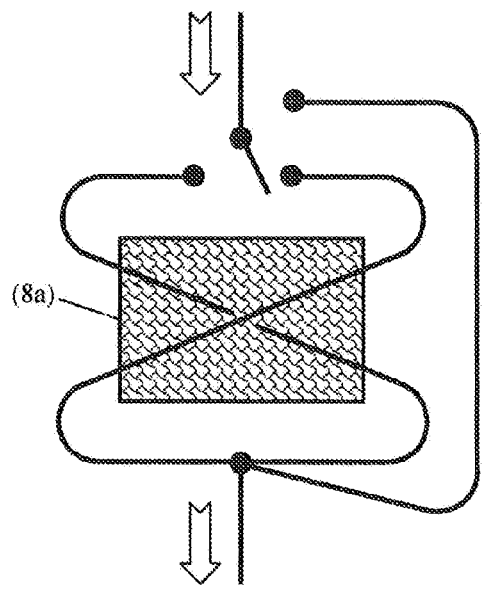
Figure 2 ... Paths through/around heat exchanger.
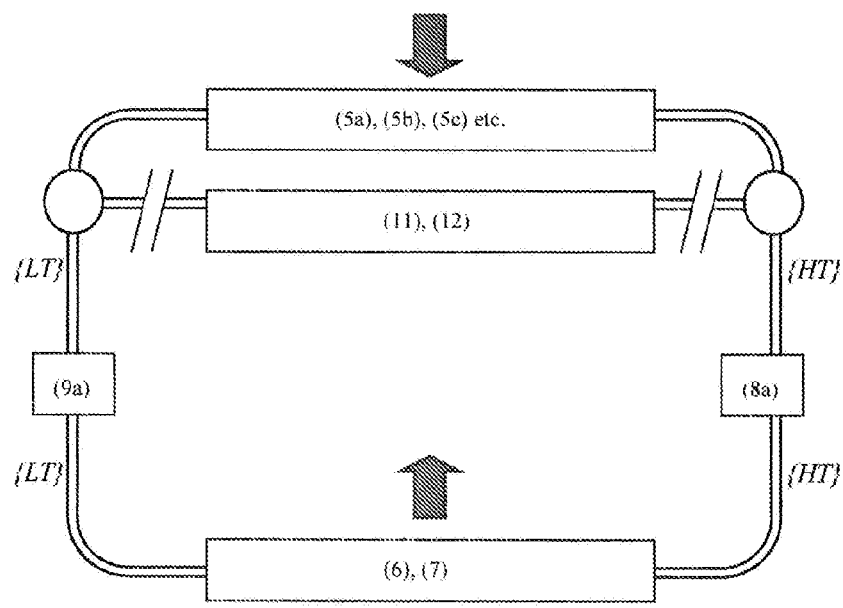
Figure 3 ... Exergy Flows in Operating Mode *(a)*.

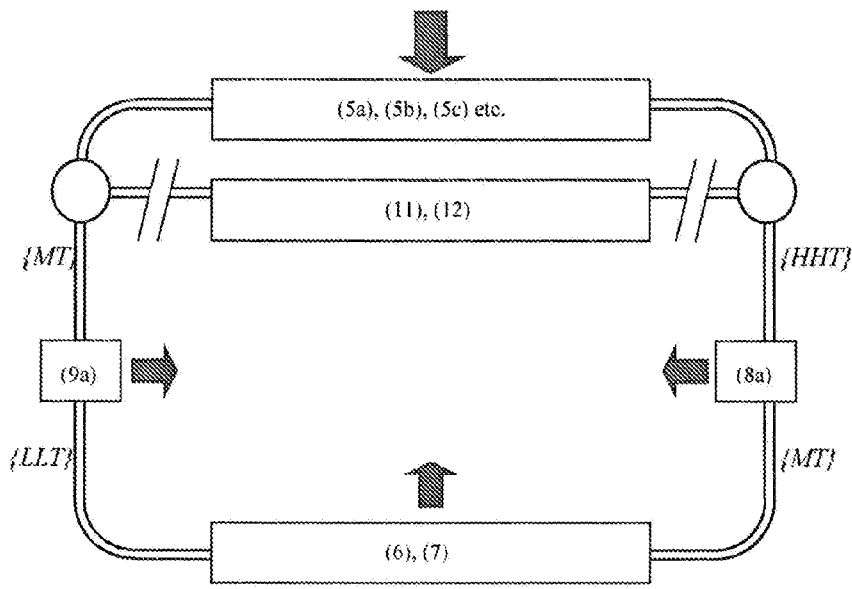
Figure 4 ... Exergy Flows in Operating Mode *(b)*.
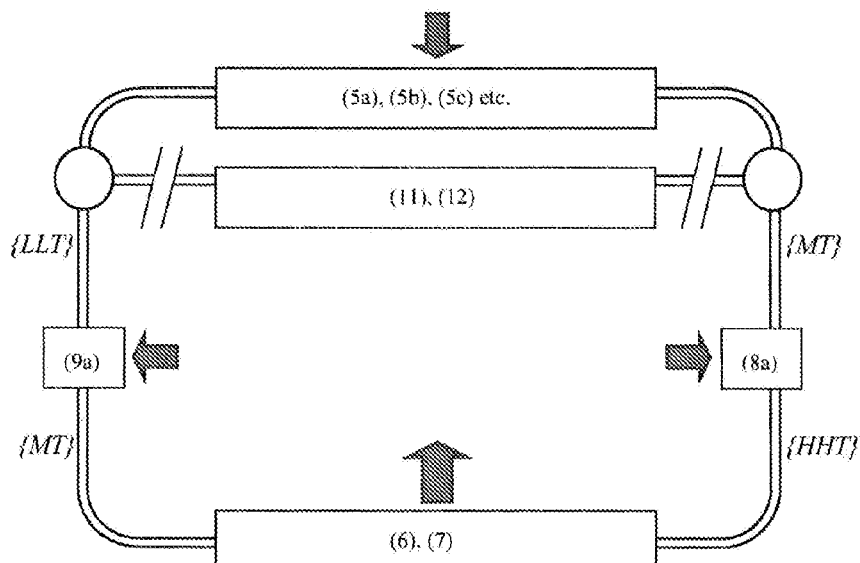
Figure 5 ... Exergy Flows in Operating Mode *(c)*.

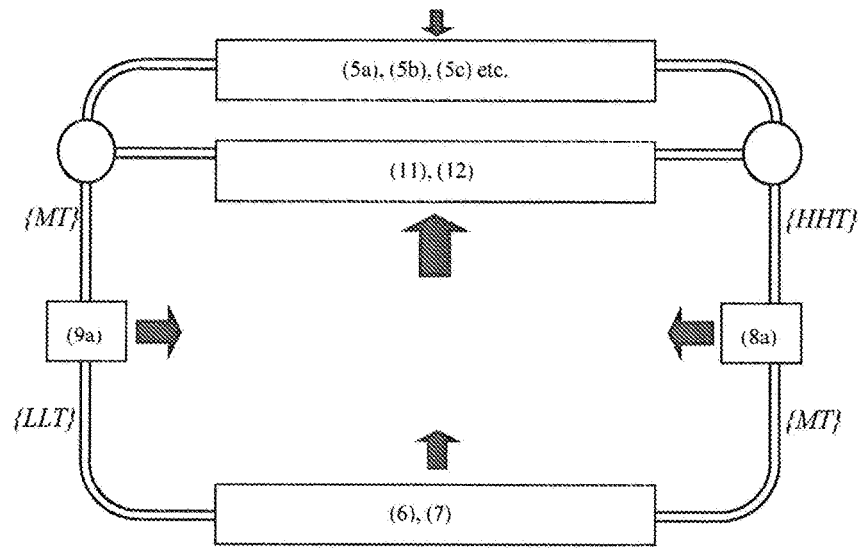
Figure 6 ... Exergy Flows in Operating Mode *(d)*.
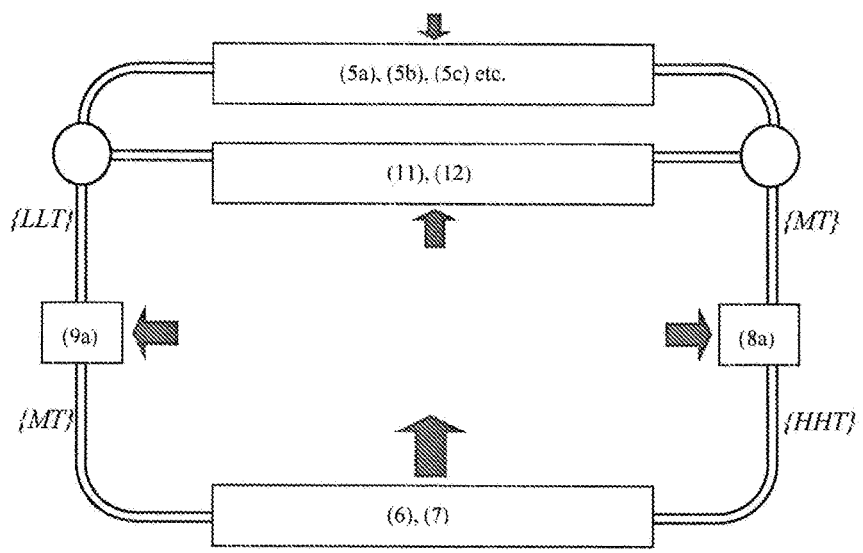
Figure 7 ... Exergy Flows in Operating Mode *(e)*.

DIRECT-DRIVE POWER CONVERSION SYSTEM FOR WIND TURBINES COMPATIBLE WITH ENERGY STORAGE

FIELD OF THE INVENTION

This invention relates to a system for converting the shaft power from large rotating wind turbines such that the energy collected is in a form compatible with direct storage.

BACKGROUND

Large wind turbines are characterised by two important features: (a) they rotate very slowly and (b) they operate intermittently because the wind resource itself is intermittent. Because of the low rotational speeds, the machines which collect the mechanical power from wind turbine rotors must deal with very high torques and this drives up costs. Gearboxes are used in most cases to increase rotational speed before the power is driven into an electrical generator but the gearboxes themselves still have to deal with the large input torque and this causes them to be both expensive and relatively unreliable.

The present invention proposes a system including a rotating machine which operates to absorb the shaft-power directly from a wind turbine by compressing some compressible fluid adiabatically (or nearly adiabatically) to some relatively large pressure ratio such that a significant temperature rise occurs. The compressible fluid is already at a high pressure before it is compressed further by the wind turbine. That pressure would certainly be upwards of 3 bar and in most practical implementations it would be upwards of 20 bar. The would normally be achieved by keeping the working fluid in a closed-circuit with the lower-pressure part of that closed-circuit still being well above atmospheric pressure.

SUMMARY OF THE INVENTION

The basic format of the invention is described with the aid of FIG. 1. In this, the power conversion system comprises a closed-circuit of gas having a high-pressure (HP) side (1) and a low-pressure (LP) side (2). The term "low-pressure" (LP) here is used in a relative sense only. It is a fundamental feature of this invention that the LP side of this gas circuit is still at a pressure substantially above atmospheric pressure—at least 3 times greater as atmospheric pressure and in most practical implementations it would be 20 times greater than atmospheric pressure. The HP side of the gas circuit is significantly higher in pressure again—such that the temperature rise in the gas associated with even a reversible adiabatic compression will be substantial. If nitrogen was used as the working gas, a pressure ratio of 50 might be used to achieve a ratio of >3.05 between the absolute temperatures of gas after and before compression. The ratio of pressures between the HP side (1) and LP side (2) of the closed gas circuit will in all cases be chosen such that a ratio of absolute temperatures greater than 1.5 can be achieved. The working gas will generally be chosen to have a high ratio of specific heats ($c_p/c_v$) and Argon is one likely choice for this reason. With Argon as the working gas, the minimum pressure ratio contemplated would be around 3.3.

The HP side of the gas circuit (1) includes a HP manifold (3) to which one or more feed tubes are attached (1a), (1b), (1c) etc. Similarly the LP side of the gas circuit (2) includes a LP manifold (4) to which one or more tubes are attached (2a), (2b), (2c), . . . etc.

One or more primary positive-displacement compressors (5a), (5b), (5c) etc. are present in the system. Each of these is coupled to one LP tube as an input and to one HP tube as an output. Thus, the primary compressor (5a) receives LP input fluid from the LP manifold through (2a) and exports HP fluid through (1a). Each one of the primary positive-displacement compressors such as (5a) is driven by a wind turbine rotor.

The reason that the gas must be at a high pressure even at the entry to each rotary compressor {(5a), (5b), . . . } is because this reduces the required inlet swept-volume of the compressor to achievable values. One can conceive of direct-drive wind turbines which compress air directly from atmospheric conditions but the inlet swept-volumes in these cases are prohibitively large. A later section provides some quantitative explanation of this fact.

One or more rotating expanders (6) are present in the system and each is coupled to an electrical generator (7). All of the gas passing through the primary compressors is also passed through this expansion system in order to extract some energy as, electrical power. The expander-generator set would normally operate at relatively high-speed in order to achieve good performance at reasonably low cost.

On the HP side (1) of the closed gas circuit, a heat-exchanger (8a) is present and this is coupled to a high-temperature thermal store (8b). This high-temperature thermal store retains heat at temperatures substantially above ambient temperature. Depending on the mode of operation of the system, heat may be drawn from the HP gas and put into the thermal store (8b) or heat may be drawn from the thermal store and injected into the HP gas. Alternatively, the heat exchanger (8a) may be by-passed altogether by the HP gas.

On the LP side (2) of the closed gas circuit, a heat-exchanger (9a) is present and this is coupled to a low-temperature thermal store (9b). This high-temperature thermal store retains heat at temperatures substantially below ambient temperature. Depending on the mode of operation of the system, coolness may be drawn from the LP gas and put into the low-temperature thermal store (9b) or coolness may be drawn from the thermal store and injected into the LP gas. Alternatively, the heat exchanger (9a) may be by-passed altogether by the LP gas.

A plenum chamber, or expansion vessel, (10) is attached to the system to allow the HP and LP pressures to remain largely unchanged even though the mass-averaged temperature of the gas in the closed system may rise or fall.

Between the LP manifold (4) and the HP manifold (3), a secondary compressor (11) is situated. This is driven by an electrical motor (12). The motor-compressor set would normally operate at relatively high-speed in order to achieve good performance at reasonably low cost. The secondary compressor (11) will normally be a dynamic machine (i.e. not a positive displacement machine).

Details that are not evident from FIG. 1 are the presence of valve systems at the HP and LP manifolds ((3) and (4)) and at the heat-exchanger units ((8a) and (9a)). FIG. 2 shows that the HP heat exchanger unit (8a) allows three different paths for the HP gas to pass through it. In this figure, gas flows from top to bottom in all cases but in one case, the gas by-passes the heat exchanger unit, in another case, it passes through in such a way that it gives up heat to the hot thermal store (8b). In the final case, the gas passes through in the opposite way such that it takes heat from the hot thermal store. Since the secondary compressor (11) will not usually be a positive displacement machine, some valving is required to ensure that when this compressor is not operating, there is no reverse flow through it.

The invention is understood through the following description of its operation.

BRIEF DESCRIPTION OF THE DRAWINGS

FIG. 2 is an enlarged view of a heat exchanger unit shown in FIG. 1;

FIG. 3 is a schematic representation of one of the operational modes of the system shown in FIG. 1;

FIG. 4 is a schematic representation of another one of the operational modes of the system shown in FIG. 1;

FIG. 5 is a schematic representation of another one of the operational modes of the system shown in FIG. 1;

FIG. 6 is a schematic representation of another one of the operational modes of the system shown in FIG. 1; and FIG. 7 is a schematic representation of another one of the operational modes of the system shown in FIG. 1.

Figure 1:
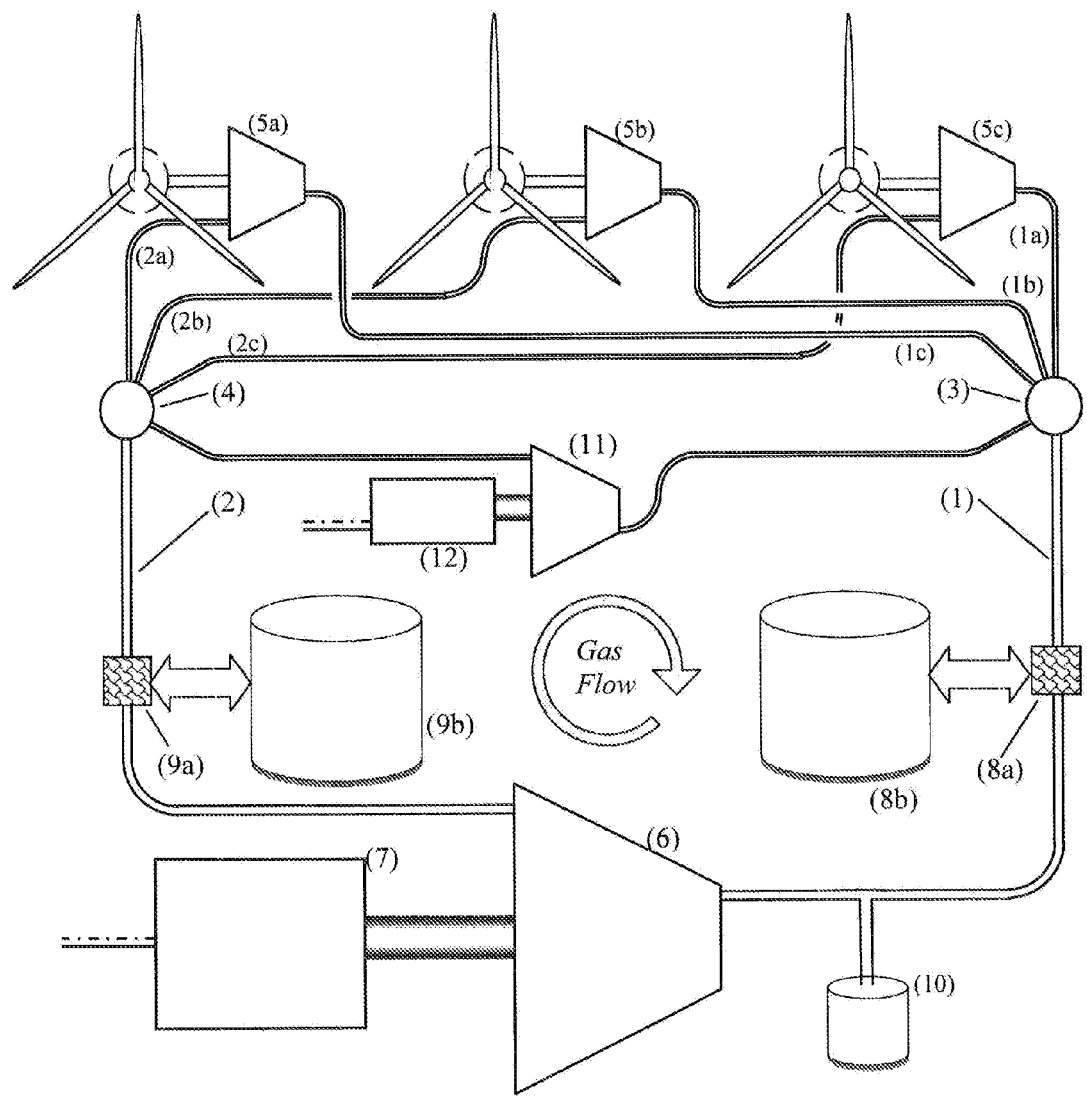
FIG. 1 is a schematic diagram of a power conversion system incorporating features of the invention.

Operation of the System.

The system has five main modes of operation:

(a) Direct production of electrical power output with no deliberate heat transfer.

(b) Reduced production of electrical power output with deliberate exergy transfer into the thermal stores.

(c) Increased production of electrical power output with deliberate recovery of exergy from the thermal stores.

(d) Further-reduced (or negative) electrical power output with deliberate exergy transfer into the thermal stores.

(e) Further-increased electrical power output with deliberate recovery of exergy from the thermal stores.

The term exergy used above is a formal thermodynamic term. Exergy describes the ability to extract work from a system by allowing it to return to equilibrium with its environment. Heat stored in a hot (hernial store has some associated exergy because one could use a heat-engine (like a Stirling Engine) to recover at least some mechanical work from it. Similarly, coldness stored in a cold thermal store has some exergy associated with it because one could use a heat-engine (like a Stirling Engine) to recover at least some mechanical work from it.

In all modes of operation described above, gas flows within the closed-system in a clockwise direction as FIG. 1 suggests—including passage through the expander (6). The only exception to this is when the system is not operating. Positive electrical power is output in the case of modes (a), (b), (c) and (e). In mode (d), the net electrical output power is normally negative—with exergy being stored in the thermal stores. Mode (d) is expected to be used for only a small fraction of the time. In operational modes (a), (b) and (c), the gas flow is driven solely by the primary compressors. In operational modes (d) and (e), any gas flow through the primary compressors (which clearly depends on the availability of wind) is supplemented with gas flow through the secondary compressor (11).

Expanded textual descriptions of the five operational modes are given below. FIGS. 3-7 provide schematic representations of these operational modes. In these figures, the block arrows represent flows of exergy. The labels {HHT}, {HT}, {MT}, {LT} and {LLT} indicate the temperature states of parts of the closed gas circuit. These correspond to very-high, high, medium, low and very-low temperature respectively.

In operational mode (a), the working as is compressed in the primary compressors (5*a*), (5*b*), (5*c*) etc. from the LP side of the circuit and pushed into the HP side at a higher temperature. That gas passes directly to the expander (6) where it is then expanded to recover most of the work originally put in. The shaft-power from the expander is fed into the main generator (7) where most of it is converted to electrical power. If the electrical generator is an AC generator, it would normally run at synchronous speed such that the electrical power produced could be fed directly into an electrical transmission system without passing through power-electronics.

If the system has been in operational for a period and then begins to operate in mode (a), the LP gas entering the primary compressors will initially be at ambient temperature and the HP gas emerging from these compressors will be very hot. Because of small thermal losses in the HP side (1) of the main gas circuit, the HP gas entering the expander (6) will be slightly less hot than that exiting the primary compressors and thus the LP gas emerging from the expander (6) will be below ambient temperature. When this slightly-cooled gas reaches the primary compressors again, these will produce cooler HP gas output than they had done originally. If operated in mode (a) for sufficiently long, the system would come to an equilibrium state in which the HP gas was significantly above ambient temperature and the LP gas was significantly below ambient temperature. These temperatures would be {HT} and {LT} shown in FIGS. 3-7.

In operational mode (b), the working gas is compressed in the primary compressors (5*a*), (5*b*), (5*c*) etc. from the LP side of the circuit and discharged into the HP side at a higher temperature as before. The HP gas passes through the HP heat-exchanger (8*a*) where heat is extracted from it and put into the high-temperature store (9*b*). The HP gas then passes to the expander (6) with a temperature only slightly above ambient. There the gas is then expanded to recover only some of work originally put in. The shaft-power from the expander is fed into the main generator (7) where most of it is converted to electrical power. The LP gas emerging from the expander is at a temperature substantially below ambient and this LP gas is then passed through the LP heat-exchanger (9*a*) where the coldness is transferred from it into the low-temperature store. The LP gas leaving the LP heat-exchanger (9*a*) is at a temperature only slightly below ambient. This LP gas is returned to the primary compressors.

In operational mode (c), the working gas again passes through the primary compressors (5*a*), (5*b*) etc. but the gas entering these primary compressors has been chilled using coolness stored in the cool thermal store, (9*b*). As the gas emerges at the HP side, it is at approximately ambient temperature and then it passes through the HP heat-exchanger unit (8*a*) which adds substantial temperature to the gas. The HP gas just before the main expander (6) is at a high temperature such that after the main expansion process, it is approximately at ambient temperature again. In this operational mode, some exergy is supplied to the gas in the closed-circuit by the primary compressors (5*a*), (5*b*), (5*c*) etc. and some is also supplied from each of the thermal stores (8*b*) and (9*b*).

In operational modes (d) and (e) the secondary compressor (11) is driven by the electric motor (12) to cause a significant flow of gas even if the compression power available from the wind turbines is small or zero.

In operational mode (d), significant exergy enters the system through the electric motor (12) and some of that exergy is put into storage in thermal stores (8*b*) and (9*b*). The remaining exergy emerges from the system again through generator set (7) but the net output of electrical power in this mode will often be negative. In other words, more electrical power is drawn from the grid to drive the motor (12) than is returned to the grid via the generator (7).

In operational mode (e), significant exergy enters the system through the electric motor (12) and additional exergy is sourced from thermal stores (8b) and (9b). The accumulated exergy emerges from the system again through generator set (7) and in this case the output electrical power will be greater than the input electrical power by a factor.

Features and Advantages of the System.

Because the system described uses pressurised gas even on the LP side of the circuit, the primary compressor units (5a), (5b), (5c) etc, can be compact even when for high powers and low rotational speeds. Thus these primary compressor units are compatible with being used in direct-drive mode with large onshore wind turbines. This contrasts with other proposals where an extremely large inlet swept volume is required.

If the system was to be used in operational mode (a) only, components (8a), (8b), (9a), (9b), (11) and (12) would not be present in the system and the system would be comparable with a straightforward wind farm which generates electricity directly. We employ the term "core system" to indicate all components which are required for the production of output electrical power. The term "storage subsystem" will be used to encompass components (8a), (8b), (9a), (9b), (11) and (12). Because a single expander-generator set may be used in conjunction with a number of wind turbines, and because the "working stress" in the primary compressors is high the total cost of the core system may be competitive with the total cost of a conventional wind farm producing the same net output electrical power.

The marginal cost of the storage subsystem for a given quantity of energy storage is extremely low by comparison with alternative methods of storing energy. Thermal energy storage is known to be very cost-effective but it suffers from the drawback of relatively poor turnaround efficiency.

The marginal energy losses associated with passing energy through storage are extremely low by comparison with alternative methods of storing energy. In most existing views of energy storage, electrical energy is drawn from the grid, converted into a form which is compatible with storage and then after the energy has been stored for some time, the energy is converted back into electricity. Thus all of the energy which passes through storage in the conventional systems undergoes two transformations and there is a loss (typically 7-15%) associated with each transformation. In the present case, most of the energy passing through storage does not undergo any additional transformations. There is some loss of efficiency associated with transferring heat but this can be relatively small.

In the steady-state, the system is fully "reversible" (in a thermodynamic sense) in all of its operational modes. In other words, if all components of the system were completely ideal, the total electrical energy emerging from the main generator (7) over a long period of time would be identical to the sum of the total electrical energy input to the motor (11) and the total mechanical energy fed into the primary compressors by wind turbines. Of course all real components introduce some irreversibility. The motors, compressors and expander(s) will all have efficiencies lower than 100%, the heat-exchangers will have finite temperature-differences across them while they are operating and the pipes and thermal-stores will suffer small energy losses through heat-exchange with the environment. This system contrasts with others where irreversibility is an intrinsic element of the system.

The Rationale for Elevated-Pressure LP side of the Gas Circuit.

The energy absorbed by an ideal compressor in each cycle is $$E_{cycle} = p_{in} \times V_{in,cycle} \times \frac{(r^{\chi} - 1)}{\chi} \tag{1}$$

where $p_{in}$ represents the inlet pressure, r represents the pressure ratio, $V_{in,cycle}$, represents the volume of inlet air sucked into the rotary compressor in each individual rotation and $\chi$ is derived from the ratio of specific heats for the gas as $$\chi := \frac{(\gamma - 1)}{\gamma} \tag{2}$$

To illustrate the above, consider a 5 MW wind turbine rotating at 1.2 rad/s in rated conditions. A single revolution of the turbine rotor takes 5.2 seconds to complete and therefore 26 MJ of energy is collected during one cycle—i.e. $E_{cycle}$=26 MJ. With r=50 and $p_{in}$=5 MPa, the required swept inlet volume of the rotary compressor can be deduced to be 3.6 m³. For a positive displacement compressor, this provides a good indication of the overall volume of the machine. The actual volume occupied by the machine might be two or three times greater than the inlet swept volume.

Note that equations (1) and (2) assume ideal gas behaviour for the working fluid. This is reasonably accurate for the fluids of most interest. Neither one of equations (1) or (2) depends on temperature. This is an important point. The input power from a 5 MW wind turbine can be absorbed by compressing 0.139 m³/s (input) of nitrogen from 5 MPa up to 250 MPa whether that input is at −100° C. or at ambient temperature.

Extensions of the Fundamental Concept.

There may be more than one compressor driven by any one wind turbine shaft in order to provide the capability for part-loading the wind turbine. With more than one compressor on a single wind turbine shaft, one might size the units differently (e.g. 2 MW and 1 MW) to allow for a wide spread of working powers.

One or more of the primary compressors such as (5a) might be driven from some other renewable energy source such as a wave energy converter or tidal energy converter.

The high temperature heat-exchanger (8a) and associated thermal store (8b) might be integrated into a single unit in the form of a thermocline. Similarly the low temperature heat-exchanger (9a) and associated thermal store (9b) might be z into a single unit. In some implementations, the low temperature thermal store might use liquid carbon-dioxide as the heat-transfer fluid.

In some implementations the electrical drive (11) for the secondary compressor (10) could be replaced by a mechanical transmission from the expander unit(s) (6).

The expander unit (7) might comprise a set of discrete expander units in order that good part-load performance can be achieved.

The system might be implemented such that a single primary compressor (5a) is present.

A contrived alternative to the present system might not use a closed system for the working fluid. Air could be used as the working fluid and a further electrically-driven compressor could be fitted to produce the "LP feed" to the primary compressors. Most of the power to run this compressor could be sourced from an expander fitted subsequent to (6) operating to drop the pressure of air further to atmospheric pressure. In this way, a close analog of the present system could be developed. This would introduce further exergy losses in the additional compression and expansion operations and in the heat-transfer which would be used to minimise the net power input for these operations.

The electric generator (7) which is driven by the expander (6) would normally be placed on the same electrical circuit as the electric motor (12) which drives the secondary compressor (11). In this way only the net power from this combination would be exchanged with the grid and thus the ratings of the line can be minimised.

The invention claim is:

1. A system comprising:
  a closed gas circuit; and
  an expander-generator set, wherein the system is configured to convert power from one or more slowly-rotating shafts into electrical power, wherein the system is configured such that, when in use, a working gas flows in the closed gas circuit, is compressed isentropically using power from the one or more slowly-rotating shafts and expanded isentropically in the expander-generator set and wherein the system is configured such that, when in use, low-pressure parts of the closed gas circuit are at a pressure at least 3 times greater than atmospheric pressure and wherein the system is configured such that, when in use, the ratio between pressures in high pressure parts and low pressure parts of the closed gas circuit is such that a ratio of absolute temperatures greater than 1.5 occurs across the compression and expansion processes.

2. The system as claimed in claim 1 which also includes thermal stores and heat-exchanger units on both the high-pressure and low-pressure parts of the closed circuit such that the system is configured such that, when in use, the power being supplied into the gas circuit by the one or more slowly-rotating shafts may be different from the power being extracted at the expander-generator set with the difference in exergy being transferred into the thermal stores or from the thermal stores.

3. The system as claimed in claim 2 comprising a motor-driven compressor such that the system is configured such that, when in use, the working gas can be circulated through the heat exchanger units and expander-generator set even when no power is available from the one or more slowly-rotating shafts.

4. The system as claimed in claim 1 comprising an expansion vessel on the closed gas circuit to allow pressures to remain stable even when the mean temperature of gas in the closed gas circuit changes.

5. The system as claimed in claim 1 wherein the expander-generator set comprises at least one of several different expanders and several different generators in order to allow performance at power levels smaller than the total rated power.

6. The system as claimed in claim 1 wherein one or more of the one or more slowly-rotating shafts are the main shafts of wind turbines.

7. The system as claimed in claim 1 wherein one or more of the one or more slowly-rotating shafts is coupled to or is configured to be coupled to more than one compressor.

8. The system as claimed in claim 1 wherein the system is configured such that, when in use, one or more of the one or more slowly-rotating shafts are driven from tidal power converters.

9. The system as claimed in claim 1 wherein the system is configured such that, when in use, one or more of the one or more slowly-rotating shafts are driven from wave energy converters.

* * * * *